United States Patent [19]

Moszkowski

[11] Patent Number: 5,033,361
[45] Date of Patent: Jul. 23, 1991

[54] VENTILATION EQUIPMENT

[76] Inventor: Stefan J. Moszkowski, Lomvagen 315, Sollentuna, Sweden

[21] Appl. No.: 438,481
[22] PCT Filed: Jun. 17, 1988
[86] PCT No.: PCT/SE88/00335
  § 371 Date: Dec. 18, 1989
  § 102(e) Date: Dec. 18, 1989
[87] PCT Pub. No.: WO88/10402
  PCT Pub. Date: Dec. 29, 1988

[30] Foreign Application Priority Data

Jun. 17, 1987 [SE] Sweden .............................. 8702537

[51] Int. Cl.⁵ .......................................... F24F 13/072
[52] U.S. Cl. ...................... 98/40.14; 165/56
[58] Field of Search .................. 98/40.14; 165/56, 57; 237/46, 69

[56] References Cited

U.S. PATENT DOCUMENTS

| | | | |
|---|---|---|---|
| 1,771,269 | 7/1930 | Musgrave et al. | 237/46 X |
| 2,245,470 | 6/1941 | Fuchs | 237/46 |
| 3,744,556 | 7/1973 | Church | 165/57 |
| 3,815,486 | 6/1974 | Morrison | 98/40.14 |
| 4,488,408 | 12/1984 | Kajitsuka | 62/277 X |
| 4,703,685 | 11/1987 | Meckler | 98/40.14 X |

Primary Examiner—William E. Tapolcai
Attorney, Agent, or Firm—Leydit, Voit & Mayer

[57] ABSTRACT

Ventilation equipment with an intake of fresh air supply device and heat emitting or absorbing ceiling panels. These panels are placed laterally adjacent to the fresh air supply device, which is formed for blowing in air laterally along the underside of the panels so that the blown-air air coacts thermally with the panels.

16 Claims, 5 Drawing Sheets

A-A

VENTILATION EQUIPMENT

The invention relates to equipment for supplying air as well as heat emission and/or absorption at a ceiling, including an elongate intake or fresh air supply device placed in or somewhat below the ceiling and at least one elongate panel arranged substantionally horisontally in the ceiling, consisting of heat conductive material and having heat emission and/or absorption means.

In a known type of such equipment, heat emitting panels are placed as the bottom wall in the fresh air supply device formed as a pressure box, one or more apertures through which air is blown being directed vertically downwards, so that the incoming air flows straight down from the ceiling. The heating panels emit radiant heat, but the fresh air hardly comes into contact with these panels, at least not to such a degree that any substantial heat transmission takes place. In certain types of this known equipment, there is additional or alternative heat absorption, i.e. cooling walls in the pressure box or on one side thereof, but neither do these walls or panels have any substantial degree of thermal exchange with the fresh air.

The known arrangements have certain disadvantages: the fresh air flowing vertically into a room can lead to cold draught, it is difficult to achieve any controlled, circulating air flow in a room, and no coaction is obtained between the fresh air, on the one hand, and the heat emitting or absorbing panels, on the other hand.

The object of the present invention is to achieve, against this background, an improved ventilation equipment of the kind referred to above, which gives controlled air flow in a room, and also enables thermal exchange between the fresh air and the heat emitting or absorbing panels.

This object is achieved by the distinguishing features disclosed in claim 1, the fresh air supply device here being formed such that air is blown in laterally along the underside of the panel or panels, enabling the blown-in air flow to coact thermally therewith.

A series of advantages are obtained with this arrangement, viz.:

ventilation, cooling and heating can be achieved with a single system, particularly if the fresh air supply device and panels comprise mutually connectable aluminum profile sections (cf. claims 7, 9 and 11);

effective thermal exchange is achieved between the fresh air and panels;

a controlled, circulating air flow is enabled, while cold draught at windows can be counteracted;

warm air which has risen by convection is recirculated from the ceiling to remaining parts of the rooms;

the ventilation equipment can be placed at the same level as light fittings in a false ceiling, whereby an undisturbed air flow in the upper part of the room can be achieved;

a low flow rate is obtained due to the elongate blowing-in aperture (cf. claim 2);

the equipment enables a simple configuration and simple installation, as well as relatively low production and installation costs;

the equipment is flexible, since the fresh air supply device can be given a desired length, it thus being well-suited for modular buildings.

Suitable embodiments and further distinguishing features of the ventilation equipment in accordance with the invention are disclosed in claims 2-16, and will now be described in more detail below with reference to the accompanying drawings, where FIG. 1 is a cross-section through an intake or fresh air supply device and ceiling heating panels in accordance with the invention;

Figure 1:
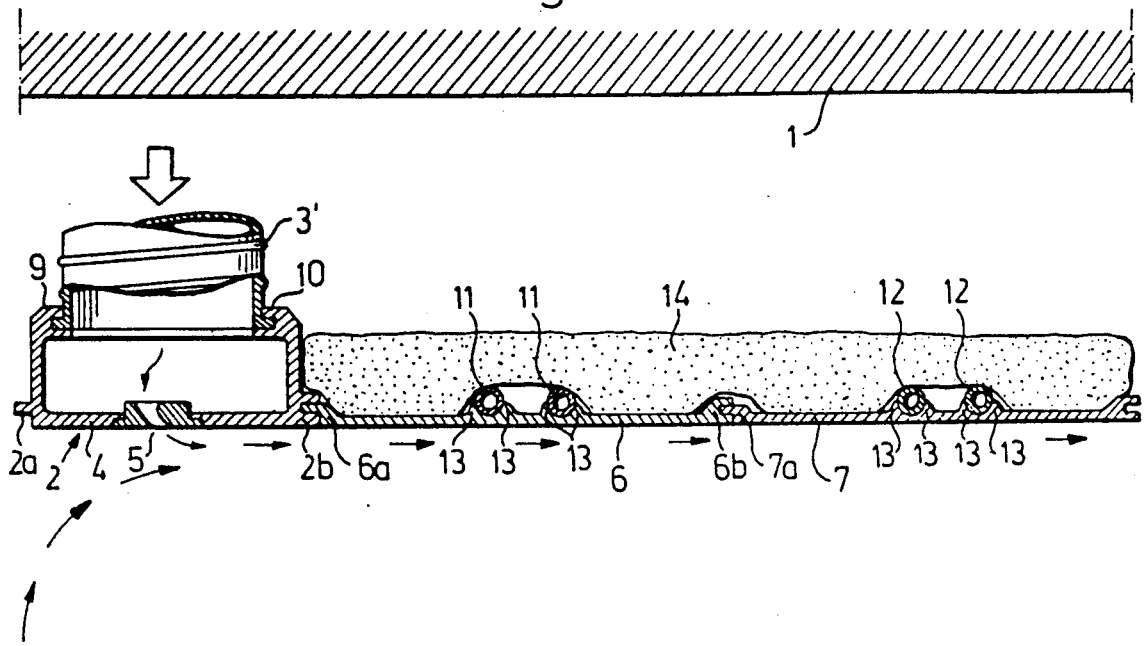
Figure 2:
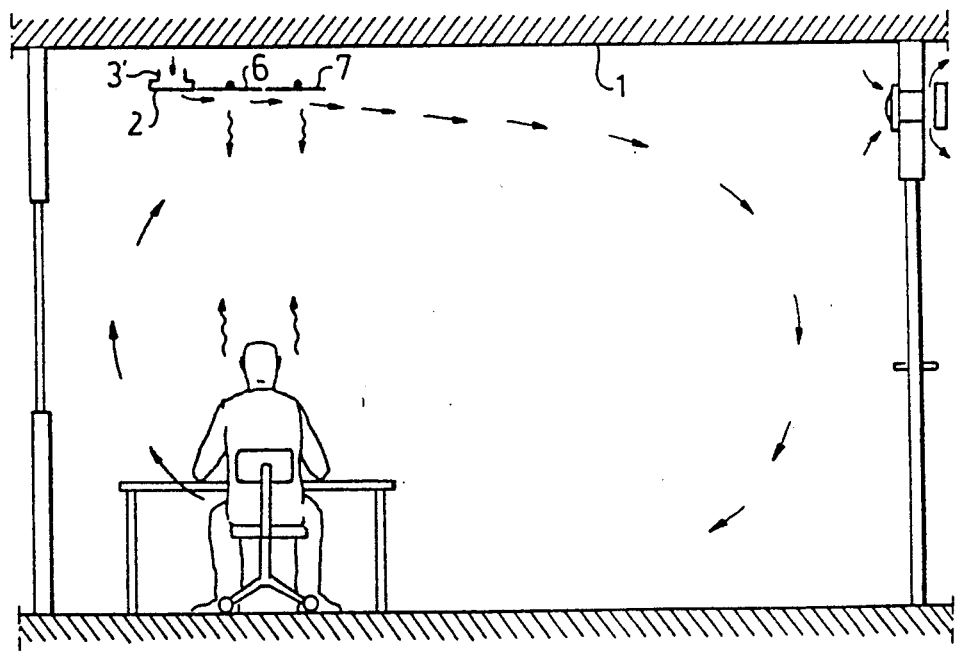
FIG. 2 illustrates in a schematic cross-sectional view how the equipment according to FIG. 1 is placed in the false ceiling of a room.
Figure 3:
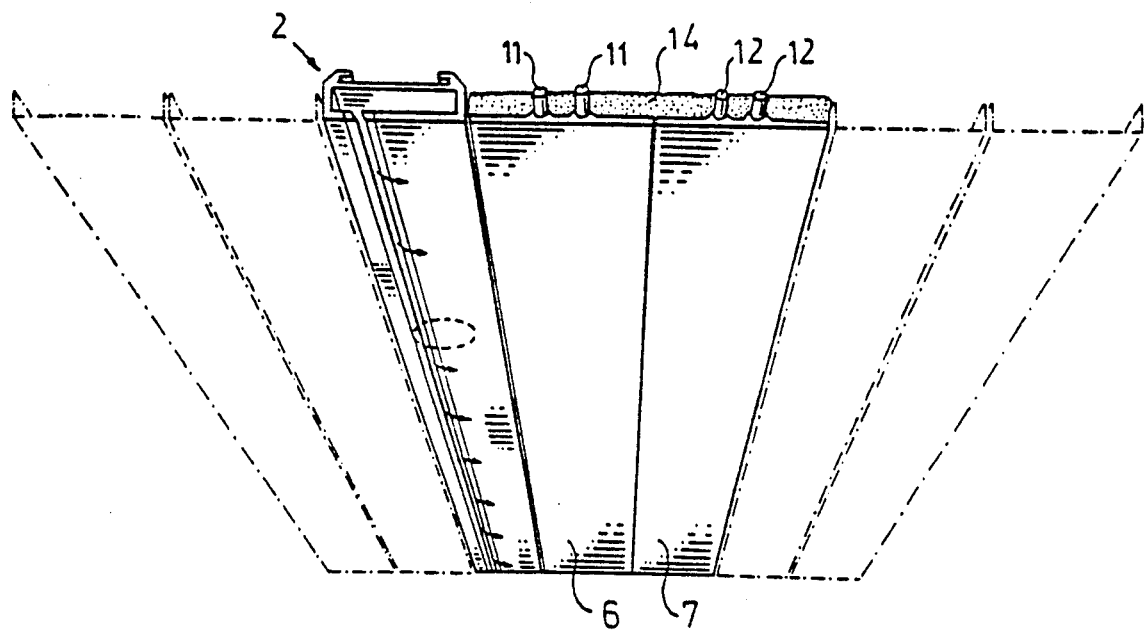
FIGS. 3 and 4 are perspective views from below of the equipment according to FIG. 1.
Figure 4:
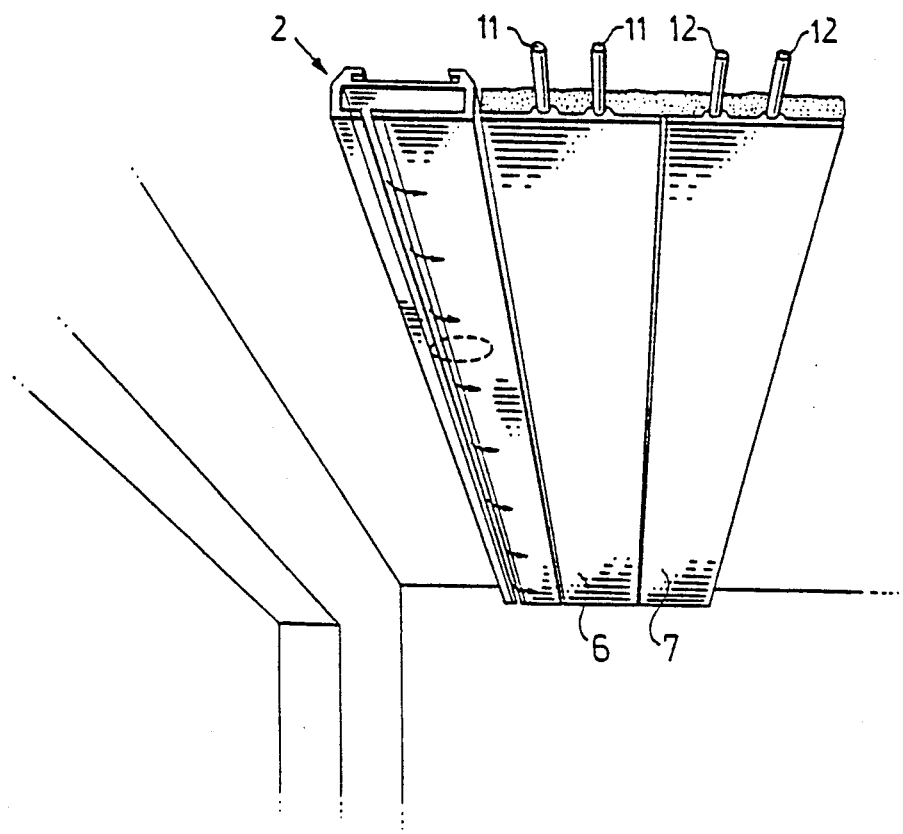

The ventilation equipment illustrated in FIGS. 1-6 essentially comprises an elongate fresh air supply device 2, which is arranged in a false ceiling under the ceiling 1 of a room, and laterally adjacent heat emitting and/or absorbing panels 6, 7. The fresh air supply device 2 is adapted for blowing in fresh air laterally along the underside of the panels 6, 7, such that a circulating air flow according to FIG. 2 is obtained in the room, while the blown-in air coacts thermally with the panels 6 and 7. This air is preferably directed inwardly in the room, so that the circulating air flow (heated in this case) is upwardly directed at the window side of the room, thus avoiding cold draught.

In the illustrated embodiment, the fresh air supply device comprises an elongate pressure box 2 with an aperture 5. The pressure box 2 comprises an extruded aluminum profile section provided at its ends with unillustrated end walls or connection members for connecting two or more sections longitudinally. The section is substantially rectangular with vertical side walls of relatively small extension in height, and an upper horizontal wall 3 of less thickness than the other walls of the section, and a lower similarly horizontal bottom wall 4 with a slot situated centrally between the side walls for accommodating an elongate insert provided with a blowing-in aperture 5.

At its sides, the profile section has above the upper wall 3 mutually opposing, parallel guide grooves 9 and 10, in which an upper connection duct 3' is slideably displaceable with the aid of mutually parallel guide lugs complementary to the guide grooves. When the connection duct 3' has been adjusted to a desired position, a connection opening is made in the thin wall 3 and the connection duct 3' is fixed, e.g. with the aid of riveting or screwing.

Downwardly, in the vicinity of the bottom wall 4, the profile section has a tongue 2a on one side wall and a groove 2b on its other side wall for mechanical connection laterally to adjacent false ceiling panels, of which at least one constitutes the mentioned heat emitting and/or absorbing panels 6, 7. To the left in FIG. 1 there may be thus connected an ordinary panel, without heat emitting and/or absorbing means, a panel corresponding to the panels 6, 7 or no panel at all (as illustrated in the figure).

Figure 5:
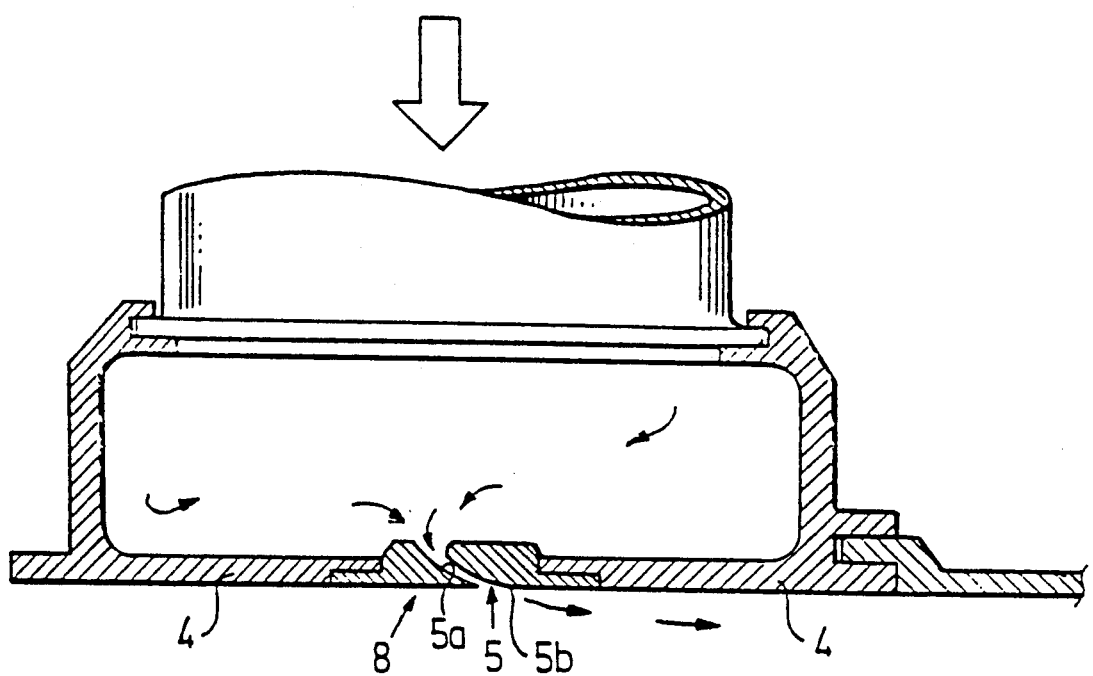
FIGS. 5 and 6 are cross-sections, in larger scales, through the blowing-in aperture of the fresh air supply device.
Figure 6:
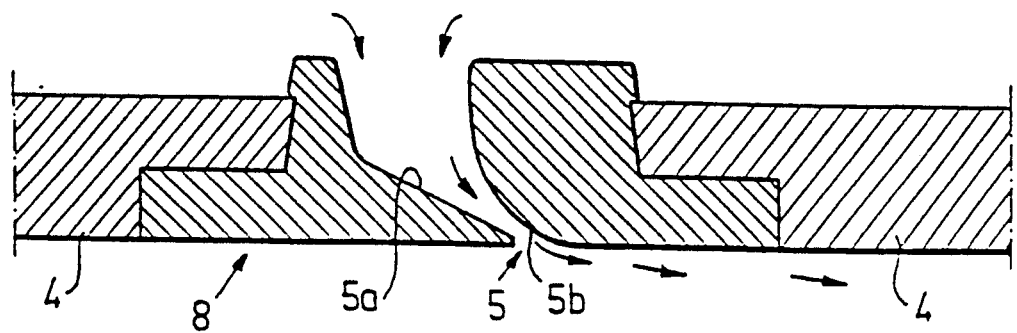

The insert 8 illustrated in larger scales in FIGS. 5 and 6 comprises two parts, the opposing surfaces 5a, 5b of which form the blowing-in aperture 5 and the undersides of which are flush with the underside of the bottom wall 4. The surface 5b is smoothly rounded and merges into the flat underside, while the surface 5a forms an acute edge angle to this underside. As will be seen from FIGS. 5 and 6, these surfaces 5a, 5b can be formed in different ways. It is essential, however, that the aperture cross-section decreases in a direction towards the exit, i.e. that both surfaces together deflect the air flow into a direction parallel to the undersides of the bottom wall 4 and the adjacent panels 6, 7. As a result of the Coanda effect, the blown-in air flow is thus being retained adjacent this underside a long distance from the blowing-in aperture.

The panels 6, 7 connected laterally to the fresh air supply device 2 are similarly made from aluminum profile sections, in this case formed as elongate sheets with connection tongues 6a, 7a and grooves 6b, 7b along their side edges (corresponding to the tongue and groove 2a, 2b on the pressure box 2). On their upper sides the panels 6, 7 have snap-locking fins 13 for heat conducting contact with, and fixation of, piping 11, 12, through which flows a heat absorbing or heat emitting medium, e.g. cold or hot water. If it is desired to supply heat to the room, hot water is thus caused to circulate to the piping area (and also possibly through the piping 12), so that the panels are heated by conduction and emit heat by downward radiation as well as by transmission to the air flowing from the adjacent fresh air supply device and along the undersides of the panels. If, on the other hand, the room needs to be cooled, e.g. during warm seasons or otherwise during strong sun radiation, cold water is caused to flow through the piping 12 (and possibly also through the piping 11) so that the blown-in air is cooled by the cold panels, and circulated in the room after such cooling. For preventing heat leakage upwards, or heat supply from above during cooling, insulation material 14 is arranged on the upper sides of the panels 6, 7, this insulation also covering the piping 11 and 12.

Figure 7:
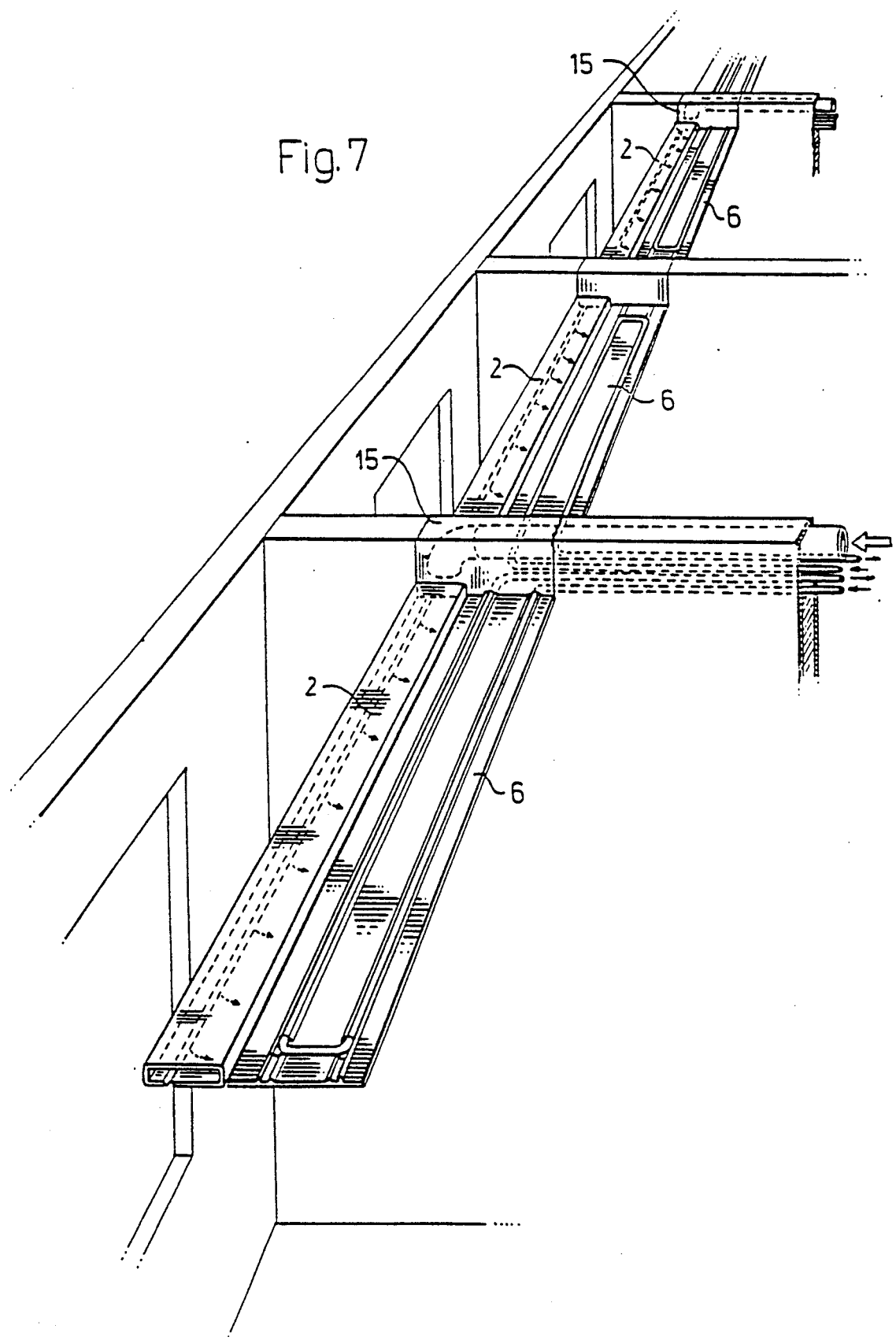
FIGS. 7, 8 and 9 illustrate an application of the invention with modular air supply devices and panels connected to supply units.
Figure 8:
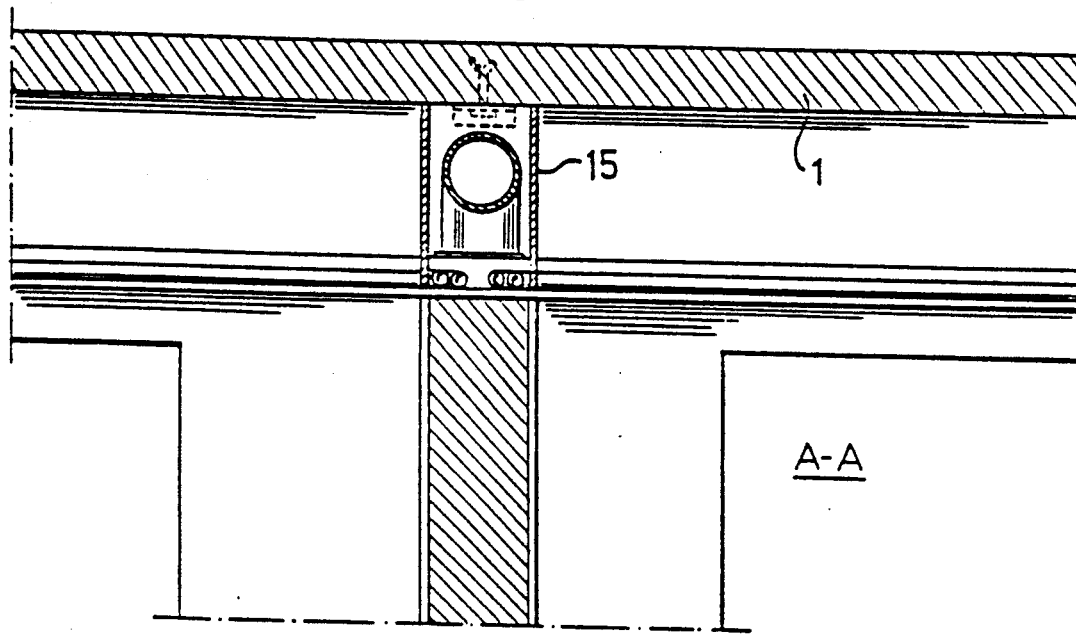
Figure 9:
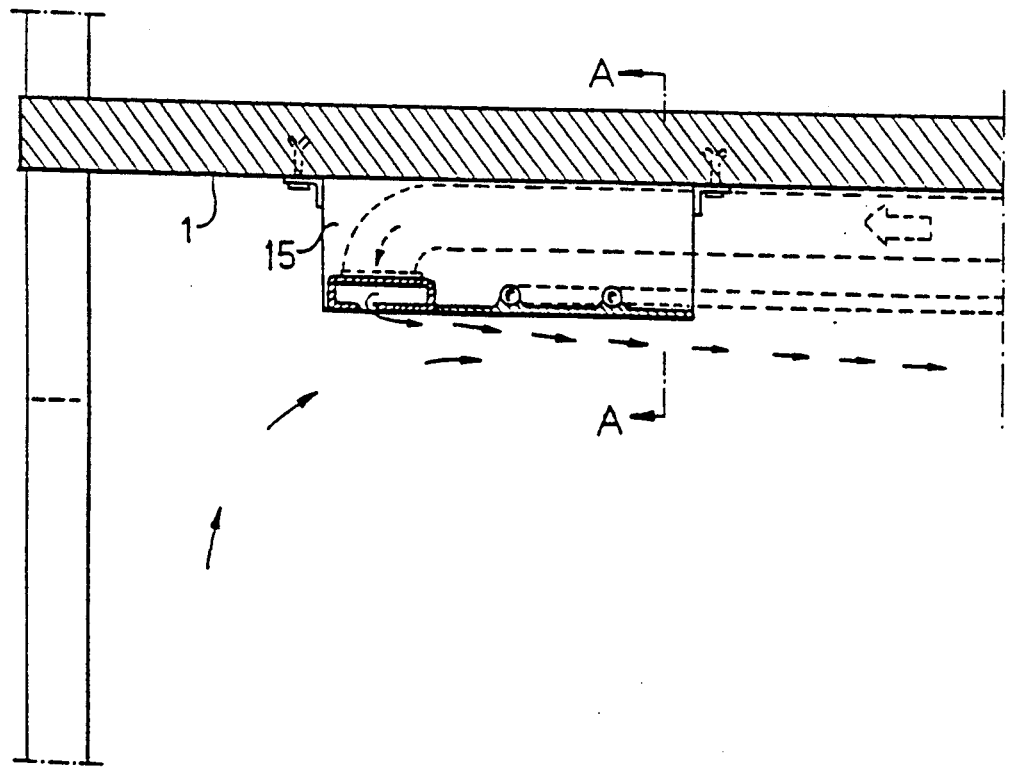

FIGS. 7-9 illustrate how the fresh air supply device 2 and the laterally adjacent heating or cooling panels 6 can be put together to separate units or modules, which are connectable to special supply units 15 for the fresh air and a heat absorbing and/or heat emitting medium. These units 15 are placed in the area for at least certain partition walls (between the room modules) under the ceiling 1, but to the greater part above the level of the connected units 2, 6 and a possible false ceiling in which these units are incorporated.

The arrangements illustrated on the drawings can be modified by one skilled in the art within the scope of the following claim 1. The fresh air supply device thus does not need to be implemented as a pressure box with a blowing-in aperture placed on its underside. However, it is essential that the air is blown in substantially horizontally and parallel to the underside of the panels 6, 7. The blowing-in aperture can be subdivided in the longitudinal direction, e.g. in the form of a plurality of openings placed in a row, which should give a horizontally directed flow pattern.

Of course, several fresh air supply devices can be arranged in larger rooms, suitably parallel to each other at even spacing.

Instead of using hot water or other heat emitting coolant, the panels can be heated electrically, preferably with aid of foil elements mounted on the upper sides of the panels (cooling can be still achieved with the aid of a flowing coolant, such as cold water).

It is not necessary for the fresh air supply device to be continuously connected on its underside to a heat emitting or absorbing panel, although this is advantageous. A certain level difference or some distance laterally can be permitted, provided that the blown in air flow can just as well reach the area of the panels and flow along the underside thereof with thermal exchange. The blowing-in aperture 5 can of course be formed directly in the bottom wall of a pressure box (without a special insert), and it is also conceivable to allow the fresh air pressure box 2 to be somewhat lower than the panels 6, 7 and have its blowing-in aperture placed in one or both of its side walls.

I claim:

1. Equipment for the supply of air as well as heat emission and/or absorption at a ceiling (1), including
   an elongate intake or fresh air supply device (2) in or somewhat below said ceiling (1), and
   at least one elongate panel (6, 7) comprising heat conductive material, arranged substantially horizontally in the ceiling with heat emitting and/or absorbing means (11, 12) characterized in that said panel (6, 7) is placed horizontally adjacent to the fresh air supply device (2), and said device (2) is implemented for blowing air substantially horizontally and parallel to said panel (6, 7) along its underside, so that the blown-in air flow coacts thermally with the panel, the fresh air supply device including a pressure box (2) with means (3) for connection to an intake or fresh air duct, a bottom wall (4) and at least one blowing-in opening (5) arranged in the pressure box, said blowing-in opening including an elongate blowing-in aperture (5) extending in the longitudinal direction of the box (2) in its bottom wall (4) and is formed for blowing air laterally towards the underside of said panel.

2. Equipment as claimed in claim 1, characterized in that the bottom wall (4) of the pressure box (2) adjoins substantially continuously to the underside of said panel (6, 7).

3. Equipment as claimed in claim 1, characterized in that the blowing-in aperture (5) is defined by two side walls (5a, 5b) which converge in the flow direction, one of the walls (5a) forming an acute edge to the underside of the bottom wall (4), while the other (5b) is rounded and smoothly merges into said underside (FIGS. 5 and 6).

4. Equipment as claimed in claim 1, characterized in that the blowing-in aperture (5) is formed in an elongate insert (8) in the bottom wall (4) of the pressure box (FIGS. 5 and 6).

5. Equipment as claimed in claim 4, characterized in that the insert (8) is exchangeable.

6. Equipment as claimed in claim 1, characterized in that the pressure box (2) substantially comprises at least one extruded aluminum profile section with end walls or means for longitudinal connection.

7. Equipment as claimed in claim 6, characterized in that the upper part of the pressure box (2) has two opposing, parallel guide grooves (9, 10) for accommodating a connection duct (3') in a desired longitudinal position.

8. Equipment as claimed in claim 1, characterized in that the long edges (2a, 2b, 6a, 6b, 7a, 7b) of the pressure box (2) and the panels (6, 7) are formed for mutual mechanical connection and/or connection to adjoining false ceiling panels.

9. Equipment as claimed in claim 1, characterized in that the pressure box (2) and said panels (6) are connectable to common supply units (15) for fresh air and a heat emitting and/or absorbing medium (FIGS. 7-9).

10. Equipment as claimed in claim 1, characterized in that said panel (6, 7) comprises extruded aluminum profile sections, provided on their upper sides with heat emitting and/or absorbing means (11, 12).

11. Equipment as claimed in claim 1, characterized in that said heat emitting and/or absorbing means comprise piping (11, 12) or ducts for a heat emitting and/or absorbing medium, said piping or ducts being in heat conducting contact with the respective panel (6, 7).

12. Equipment as claimed in claim 11, characterized in that said panel (6, 7) has snap-locking fins (13) for fixing said piping (11, 12).

13. Equipment as claimed in claim 11, characterized in that said medium is water.

14. Equipment as claimed in claim 1, characterized in that said heat emitting means include electrical heating elements.

15. Equipment as claimed in claim 1, characterized in that the panel is provided on their upper side with heat insulating material (14) which also covers said heat emitting and/or absorbing means (11, 12).

16. Equipment, used with a source of pressurized air, for the supply of thermally conditioned air at a ceiling comprising:
- an elongate air chamber, located towards the ceiling, coupled to the source of pressurized air;
- an elongate heat conductive panel arranged generally horizontally adjacent the air chamber, the panel including an underside and means for transferring heat to or from the panel;
- the air chamber including at least one opening formed along the length thereof to direct the pressurized air horizontally towards the underside of the panel so heat is transferred between the air passing beneath the underside of the panel and the panel.

* * * * *